US006624989B2

(12) United States Patent
Brooks, Jr.

(10) Patent No.: US 6,624,989 B2
(45) Date of Patent: Sep. 23, 2003

(54) ARC SUPPRESSING CIRCUIT EMPLOYING A TRIGGERABLE ELECTRONIC SWITCH TO PROTECT SWITCH CONTACTS

(75) Inventor: Vernon Brooks, Jr., Roanoke, IN (US)

(73) Assignee: Franklin Electric Company, Inc., Bluffton, IN (US)

( * ) Notice: Subject to any disclaimer, the term of this patent is extended or adjusted under 35 U.S.C. 154(b) by 288 days.

(21) Appl. No.: 09/861,350

(22) Filed: May 18, 2001

(65) Prior Publication Data

US 2002/0171983 A1 Nov. 21, 2002

(51) Int. Cl.[7] .................................................. H02H 3/00
(52) U.S. Cl. ................................................ 361/6; 361/3
(58) Field of Search ................................ 361/2, 3, 6, 8, 361/13; 307/113, 116, 125, 126, 130

(56) References Cited

U.S. PATENT DOCUMENTS 3,558,910 A * 1/1971 Dale .......................... 307/136
4,025,820 A * 5/1977 Penrod .......................... 361/8
4,531,172 A * 7/1985 Mertz .......................... 361/13
4,709,294 A * 11/1987 Kim ............................ 361/58
5,283,706 A * 2/1994 Lillemo et al. ................ 361/3
5,633,540 A * 5/1997 Moan ......................... 307/126

* cited by examiner

*Primary Examiner*—Matthew V. Nguyen
(74) *Attorney, Agent, or Firm*—Marshall, Gerstein & Borun

(57) ABSTRACT

Circuits and methods are disclosed for suppressing arcing occurring in switch contacts that includes a triggerable electronic switch in parallel with a series connection of relay switches. The trigger electrode of the triggerable electronic switch is connected to a node between the series connected relay switches, which allows the electronic switch to be turned on to a conducting state when a voltage difference occurs between the node and either of the opposite ends of the switches. The voltage difference arises because of arcing that occurs when the relay switches bounce, typically during opening and closing of the relay switches. The opposite ends of the switches are connected to conduction terminals of the electronic switch, where the electronic switch carries substantially all of the current supplied to a load for a half-cycle or less of an AC current cycle when arcing occurs in the relay switches, thereby bypassing the relay switches and suppressing arcing therein.

23 Claims, 7 Drawing Sheets

ARC SUPPRESSING CIRCUIT EMPLOYING A TRIGGERABLE ELECTRONIC SWITCH TO PROTECT SWITCH CONTACTS

FIELD OF THE INVENTION

The present invention relates generally to electronic switches and, more particularly, to an arc suppressing circuit employing a triggerable electronic switch to protect switch contacts.

BACKGROUND OF THE INVENTION

In systems where power to a load is switched using an electro-mechanical switch, wear of the contacts of the switch often occurs due to sparking or arcing between the contacts of the switch primarily during times of opening and closing of the switch and, more particularly, when the switch contacts "bounce" during closing of the switch. Arcing across the contacts arises due to a voltage difference across the contacts of the electrical switch that is caused by the bouncing of the switch contacts. To illustrate an example of circuit conditions occurring during bouncing of an electro-mechanical switch, FIGS. 4 and 5A–5C show a conventional relay switching circuit and the voltage and current conditions occurring in the circuit. The circuit 400 shown in FIG. 4 illustrates a relay switching circuit including a voltage source 402 supplying voltage through a relay switch 404 to a load 406 (e.g., a motor). The relay switch 404 has two contacts 408 and 410, which are electrically connected together when a voltage from source $V_2$ is applied to relay coil 412.

As illustrated in FIG. 5A, a voltage is present across contacts 408 and 410 when the switch 404 is open. At a time $t_1$, the relay coil 412 is energized thereby creating a magnetic field that presents a force to close switch 404. After a time delay from time $t_1$ to time $t_2$, the contacts 408 and 410 of switch 404 are electrically connected together and the voltage across the contacts drops to zero volts as shown in FIG. 5A. Also at time $t_2$ the voltage is delivered to the load 406 and current begins to flow through the load 406 as shown in FIG. 5B. The switch 404, however, tends to bounce, which creates arcing across the contacts of the switch 404 due to a voltage arising due the break of electrical contact. This voltage rise due to bouncing of the switch 404 is illustrated in FIG. 5A between time $t_2$ and time $t_3$. It is this voltage rise and associated arcing that causes wear to the contacts of the electrical switch.

One approach to mitigate the effects of arcing in power control circuits that have need for relay switching (e.g., motor controllers) is to use solid state relays since their life exceeds that of conventional electro-mechanical relays. Electro-mechanical relays are shorter lived due to the arcing explained above. Solid state relays, however, are much more costly than conventional electro-mechanical relays and require heat sinking, which increases the space required for the solid state relay. In cases where the cost or size of solid state relays is prohibitive, substitution is usually made by providing a larger and higher rated electro-mechanical relay so as to increase the life of the relay contacts in a particular circuit. This, however, also increases the cost and size requirements for the electro-mechanical relay switching.

Another approach to mitigating contact wear, is to employ arc suppression circuits that prevent or extinguish arcing by shorting in parallel with a switch during periods of arcing, thereby increasing the switch life. Some known arc suppressing circuits include a triggerable electronic switch, such as a triac, in parallel with a switch. In such circuits, the triac is typically triggered by a triggering circuit that senses when voltage is present across the contacts or triggers during known periods of contact opening, closing or bouncing. Such triggering circuits can be complex and add components to the switching circuitry, which increases cost and complexity of the circuit. Additionally, the circuits typically require heat sinking of the triac semiconductor due to the triac conducting for a number of AC cycles, which increases the space needed for the arc suppression circuitry.

BRIEF DESCRIPTION OF DRAWINGS

Reference is made to the attached drawings, wherein elements having the same reference numeral designations represent like elements throughout and wherein.

DETAILED DESCRIPTION OF THE PREFERRED EMBODIMENTS

From the foregoing, persons of ordinary skill in the art will appropriate that the disclosed arc suppressing circuit is more easily implemented, affords reduced size and cost, does not require heat sinking and may be employed in a smaller space than conventional arc suppression circuits by permitting reduction of the switch rating. In particular, the disclosed arc suppressing circuit utilizes two series connected switches that are simultaneously operated by a relay coil and a triac in parallel with the series combination of the two switches for permitting bypass of current during instances of switch bounce that creates arcing across the contacts of the switches. The triac has a gate electrode that is connected to a center or common node connection of the two switches, thereby switching a triac to a conduction state when a voltage differential occurs between the center node and a terminal of the triac.

Figure 1:
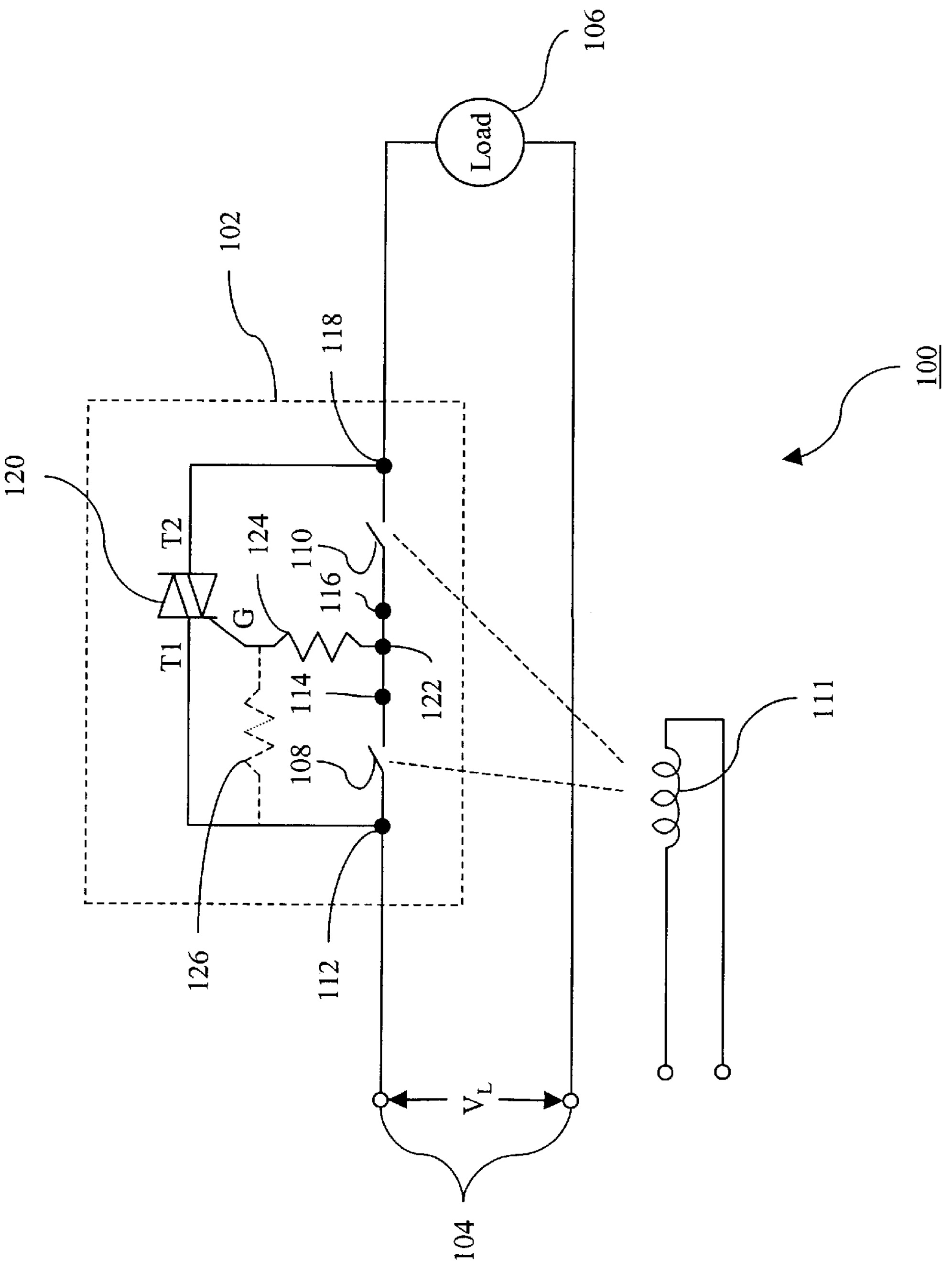
FIG. 1 illustrates a power switching circuit employing an arc suppressing circuit constructed in accordance with the teachings of the present invention.

FIG. 1 illustrates a power control circuit 100 employing an arc suppression circuit 102 constructed in accordance with the teachings of the invention that is used to control the delivery of a line voltage $V_L$ applied at terminals 104 to a load 106. The are suppression circuit 102 includes two series connected switches 108 and 110 that are preferably mechanically linked so that they are substantially simultaneously closed by the application of a voltage to relay coil 111. Each of the switches 108, 110 has a pair of contacts 112, 114 and 116, 118, respectively. Connected in parallel with the series connection of the switches 108, 110 is a triggerable electronic switch, implemented in this example by a triac 120. The triac 120 has three terminals that include main connection terminals T1, T2 and trigger gate terminal G. The gate terminal G is connected to a center node 122 located between the connected contacts 114, 116 of the switches 108, 110. The common node 122 is connected to the gate terminal G via a resistance, (e.g., resistor 124), which limits current to the gate terminal G. In a preferred example, the resistor 124 is set at 100 Ω although different resistance values may be selected dependent on the particular application.

In an alternate example, a second resistance, such as resistor 126 shown dashed, is additionally connected between terminal T1 and the gate terminal G in order to further desensitize the gate terminal G and guard against transient voltages and noise such that triggering of the gate terminal G will occur only when larger voltage differences are present across terminal T1 and gate terminal G (i.e., a voltage difference that occurs during a true bounce of the switch 108, for example). Preferably, the resistor 126 is set at 47 Ω, although different resistance values may be selected dependent on the particular application.

Preferably, the triac 120 is rated for 600 V, although different sizes may be selected dependent on the particular application. Further, the triac 120 preferably has a high static dV/dt turn-on rating to ensure that external line transients and noise do not inadvertently trigger the triac. For example, it has been found that a dV/dt rating of 100 V/μsec or greater is sufficient to account for transient voltages and noise. However, in order to ensure no false triggering of the triac 120 occurs in field operating conditions, a dV/dt rating of 250 V/μsec or greater is preferable. Additionally, the triac 120 is preferably operated in Quadrants I and III for triac gating, although it is not necessarily limited to operation in these quadrants.

In operation, the energization of relay coil 111 causes both switches 108, 110 to close substantially simultaneously since the switches are preferably linked mechanically, thereby allowing voltage $V_L$ to be delivered to the load 106. During this time, however, the switches 108, 110 may bounce, which causes arcing to occur across the contacts of the switches that are bouncing. A voltage difference will occur across the contacts of the switches 108, 110 for the short period of time when the contacts are bouncing. For example, if switch 108 bounces during closing, a voltage difference will arise across contacts 112, 114 during time periods when those switch contacts physically separate.

Arcing may also occur across the contacts of switches 108, 110 during bounces of those switch contacts. In the previous example, the voltage difference that occurs across the contacts 112, 114 of switch 108 will also occur between terminal T1 of the triac 120 and the gate terminal G of the triac 120. This voltage difference triggers the triac 120 to turn "on" to a conducting state, which causes substantially all of the current delivered to the load 106 to flow through the triac 120 instead of the contacts of switch 108 because the triac presents a lower impedance path than does the open switches.

More particularly, the triggering of the triac 120 to a conducting state occurs when the switch 108 is open due to bouncing and the switch 110 is still closed or, at least, has sufficient arcing across it in order to conduct a current from the gate G of triac 120 to contact 118. During the opening of switch 108, the rapid increase in voltage (e.g., high dV/dt) between terminal T1 of triac 120 and the gate G terminal causes the Gate trigger current $I_{GT}$ to be exceeded. When the Gate trigger current $I_{GT}$ is exceeded the triac 120 is switched to a conducting state. It is noted that in distinction to this described operation where switch 108 opens slightly prior to switch 110, if switch 110 opens before switch 108 in the circuit of FIG. 1, the triac 120 will not be triggered to a conducting state until switch 108 bounces, which gives rise to an open circuit in switch 108.

When the triac 120 is in a conducting state, current conducts from terminal T1 to terminal T2 for a half-cycle of AC current or less. That is, the triac 120 conducts until the current passes through zero amperes in the AC cycle, at which time the triac 120 returns to a non-conducting state. Additionally, by the time the triac 120 returns to the non-conducting state, a voltage difference will no longer be present since the switch 108 has had time to de-bounce. Thus, depending on the particular time that the triac 120 is triggered during the present half-cycle, the time of conduction will be at most one half-cycle of the AC cycle. During the time that the triac 120 is in a conducting state, the switch 108 has time to fully close and, thus, it no longer will give rise to arcing conditions.

Figure 6:
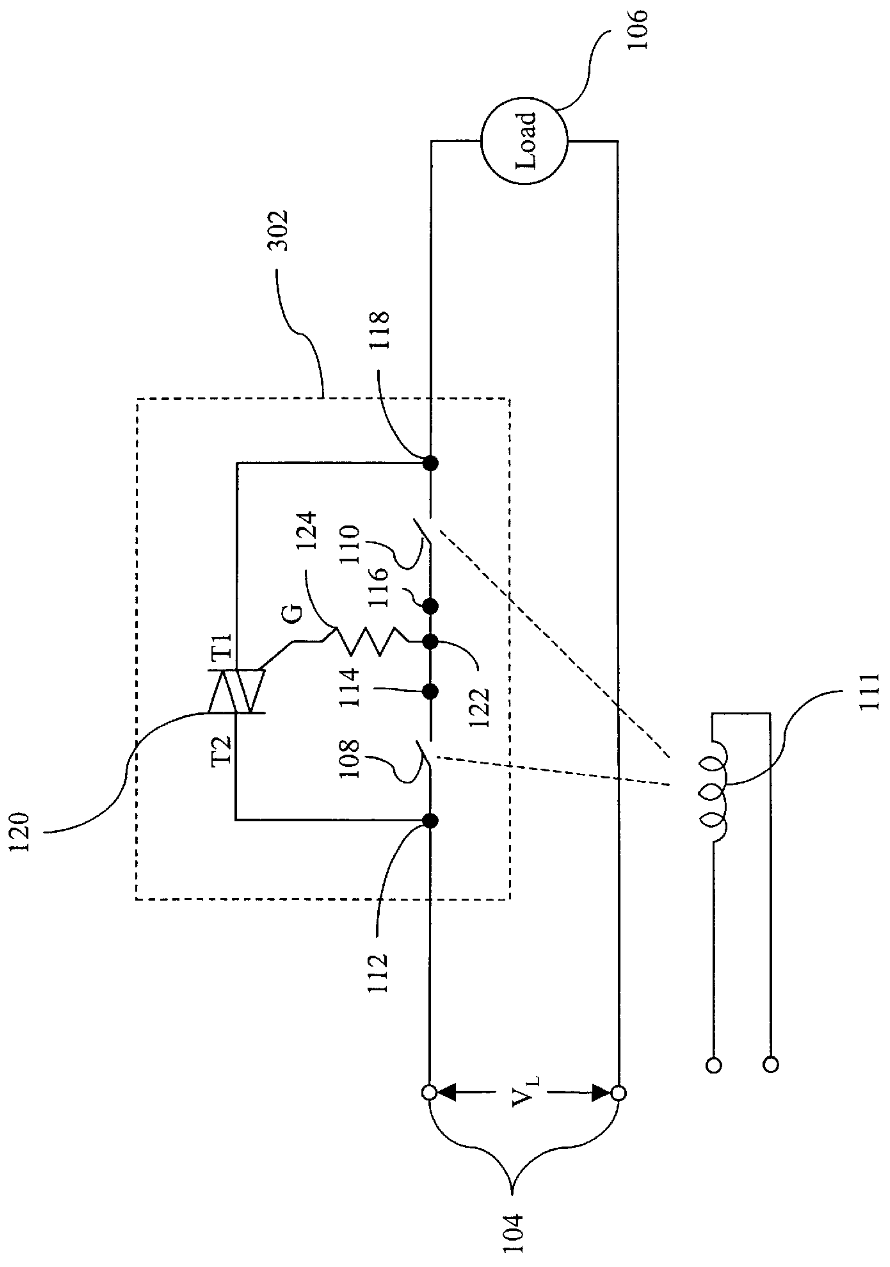
FIG. 6 illustrates an alternate arrangement of the power switching circuit illustrated in FIG. 1.

Alternatively, the triac 120 may be connected in a reverse configuration as shown in FIG. 6. Thus, in the circuit 302 of FIG. 6, when arcing occurs due to bouncing of switch 110 and arcing is not yet occurring or just beginning in switch 108, a voltage difference between the gate terminal G and terminal T1 will arise thereby turning on triac 120 to conduct in the direction from terminal T1 to T2 for at most a half-cycle of the AC current. In contrast to the circuit of FIG. 1, the triac 120 of arc suppression circuit 302 shown in FIG. 6 is triggered when a voltage difference occurs across switch 110, rather than switch 108.

In either of the examples of FIGS. 1 and 6, the maximum time period that the triac 120 carries current is relatively short (e.g., approximately an eight (8) millisecond half-cycle for a 60 hertz power supply). Accordingly, the triac 120 does not become hot and, thus, no heat sink is needed for the triac 120.

During the portion of an alternating current cycle when the current flows from the load to the voltage source connected to terminals 104 of FIG. 1 through the switched leg containing switches 108 and 110, a negative voltage present when arcing occurs across the contacts of switch 108 will produce a voltage difference between terminal T1 of triac 120 and the gate terminal G such that current will flow from terminal T2 to terminal T1 in the triac 120.

Given the example above, it is evident that the series combination of switches 108, 110 enables the triac 120 to be switched to a conducting state irrespective of the instantaneous voltage polarity. Additionally, the use of two series connected switches 108 and 110 having the gate terminal G of triac 120 electrically connected to a center node 122 (via resistor 124) allows the flow of current to be stopped when relay coil 111 is de-energized and the switches 108, 110 open. That is, when arcing is present across either of switches 108, 110 the triac 120 will conduct for a half-cycle or less, thereby extinguishing any arcing. Additionally, since the gate terminal G is connected to the common node 122 between the two switches 108, 110, when these switches are open with no arcing occurring, zero volts will be present at node 122 and, thus, the triac 120 will not be switched to a conducting state. Thus, application of the line voltage $V_L$ to the load 106 is properly prevented when the switches 108, 110 are open.

Figure 2:
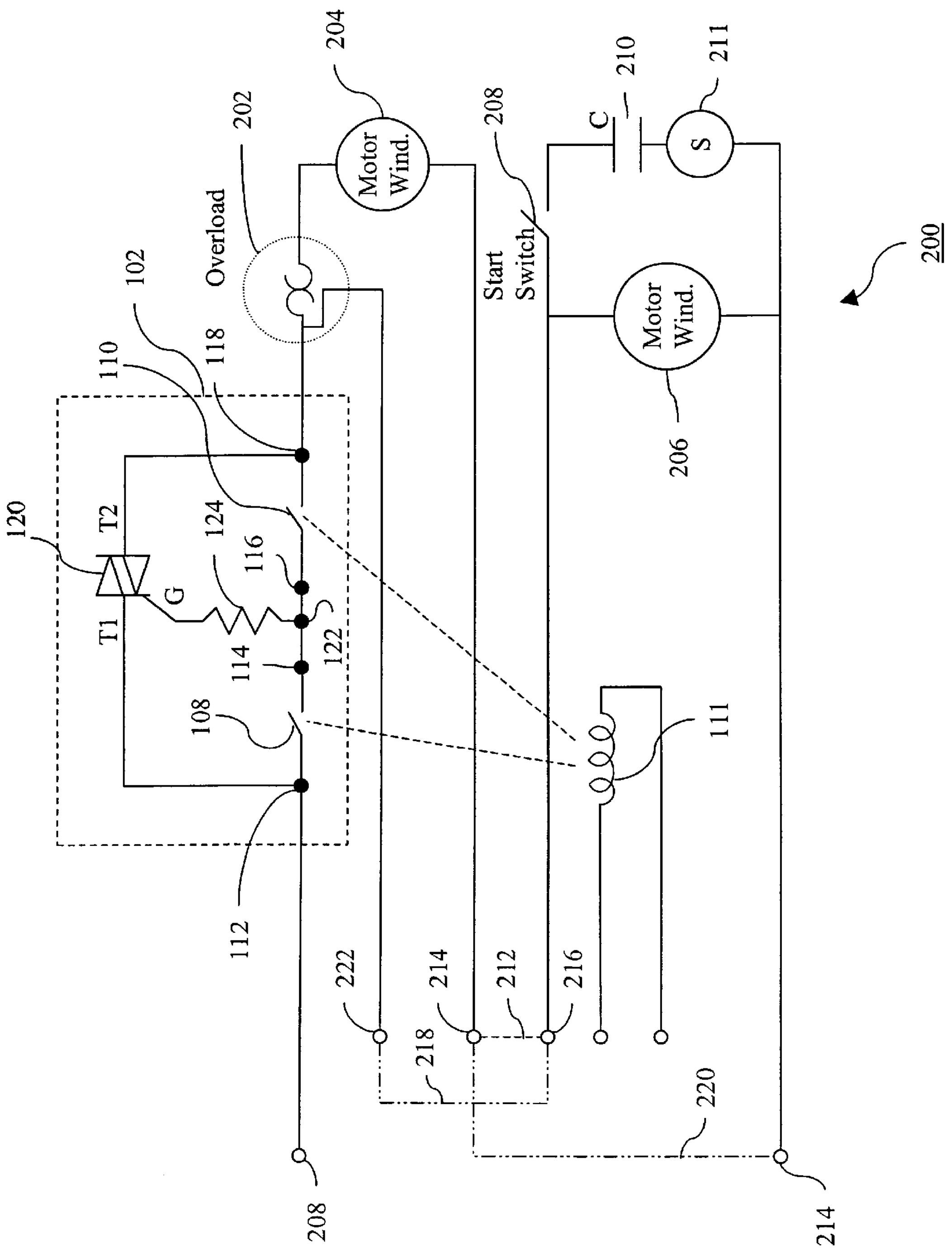
FIG. 2 illustrates a motor control circuit utilizing an arc suppression circuit constructed in accordance with the teachings of the present invention.

FIG. 2 illustrates an exemplary application of the disclosed arc suppression circuit 102. The exemplary circuit 200 of FIG. 2 is a control circuit for a dual voltage motor. The control circuit 200 employs the arc protection circuit 102 connected in series with at least a first motor winding 204. The first motor winding 204 is connected to the arc protection circuit 102 by an overload circuit 202, which protects the motor from current overload conditions. A second motor winding 206 is provided and may be connected either in series or in parallel across the line voltage terminals 208, 210 depending on the voltage setting of the motor (e.g., high or low voltage). A dashed connection 212 between terminals 214 and 216 illustrates a series connection of the motor windings 204 and 206 that effect a high voltage connection for the motor. Alternatively, double dash connections 218, 220 between terminals 222, 216 and 214, 210, respectively, illustrate a connection configuration of the motor terminals for low voltage operation wherein the motor windings 204, 206 are connected in parallel across the line voltage $V_L$.

In parallel with motor winding 206 is a series of elements including a start switch 208 a capacitor 210 and starter winding 211. Through the use of the start switch 208 the starter winding 211 is only momentarily energized to start the motor. After the motor has started and has accelerated to full speed, the start switch 208 is opened in order to allow full energization of motor windings 204, 206.

Relay coil 111 is utilized to close switches 108, 110, which are connected such that they operate substantially simultaneously. The relay coil may be energized by any power source or by the line voltage $V_L$. When the relay coil 111 is energized, the switches 108, 110 close thereby allowing voltage from terminal 208 to be applied to the motor winding 204. If the switches 108, 110 bounce or one closes before the other, the triac 120 operates to carry the current to motor windings 204, 206 and, thus, extinguishes any arcing that may occur in either of the switches 108, 110.

Figures 3A, 3B, 3C:
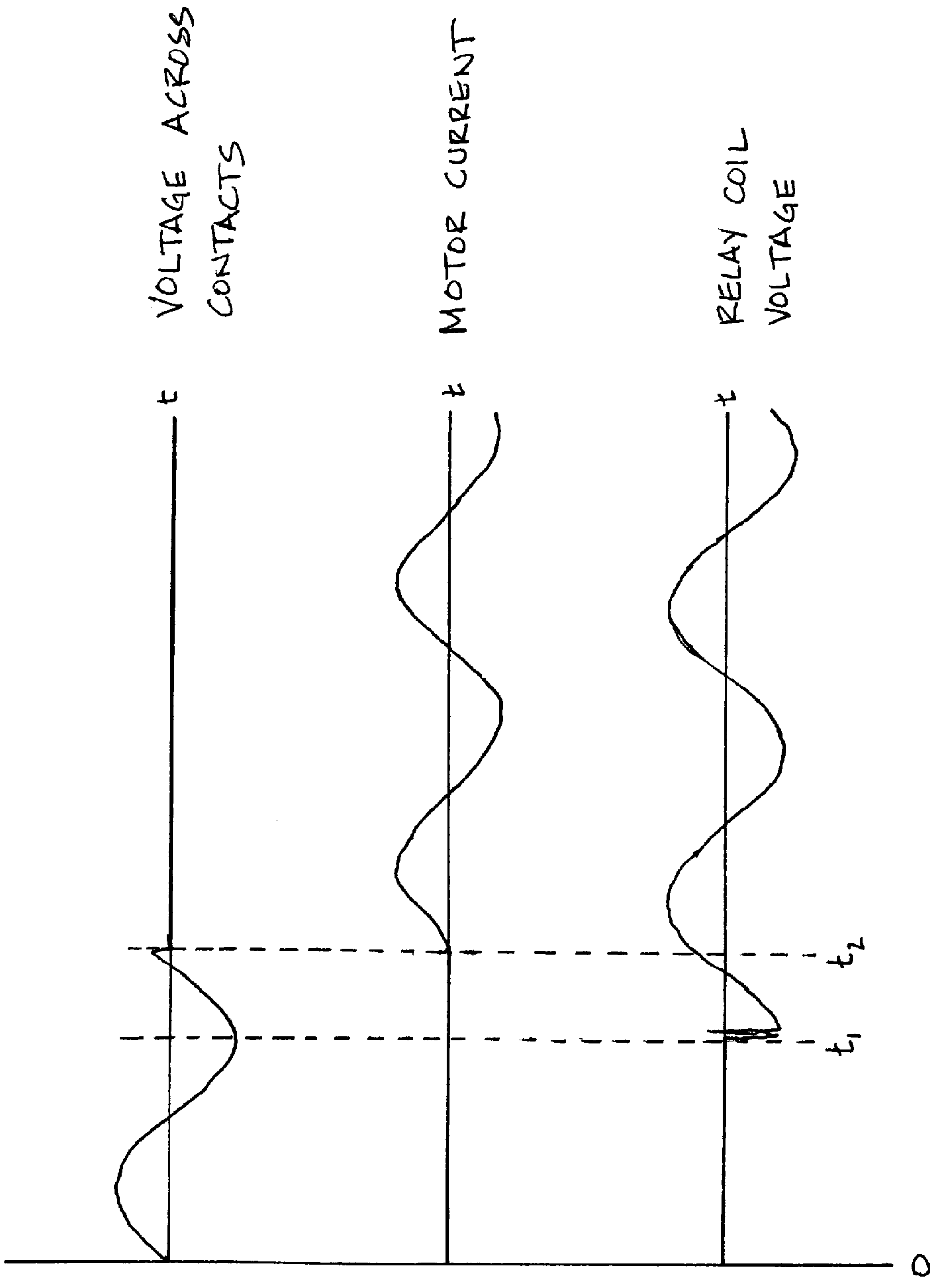
FIGS. 3A–3C illustrate voltage and current waveforms occurring at various points in the circuit illustrated in FIG. 2.
Figure 4:
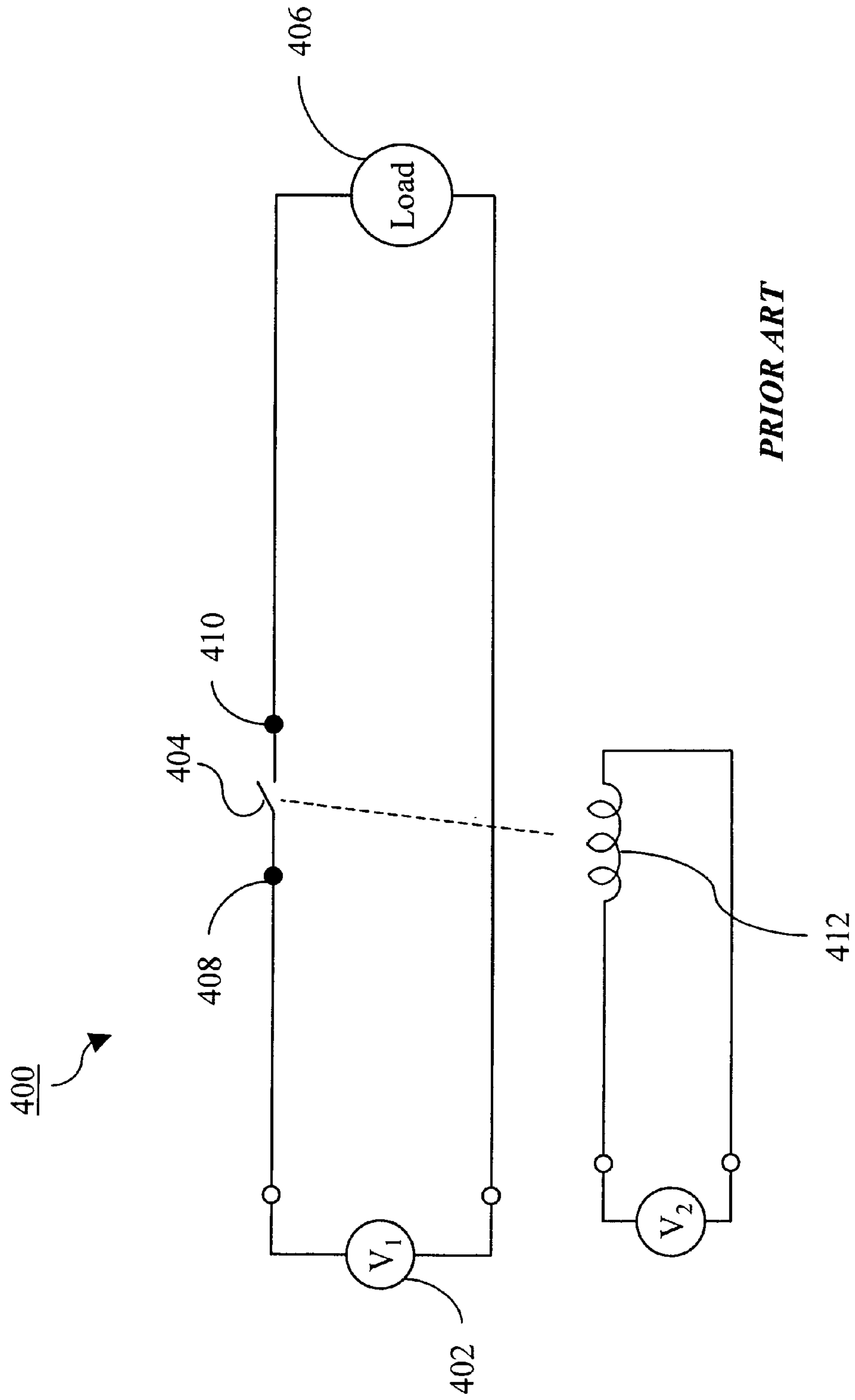
PRIOR ART FIG. 4
FIG. 4 illustrates a conventional relay switch circuit that does not utilize arc suppression.

FIGS. 3A through 3C illustrate the voltage and current waveforms that occur in the circuit 200 of FIG. 2 during starting of the motor. In particular, FIG. 3A illustrates the voltage across the contacts of switch 108 during the time period in which the relay coil 111 is energized to close switch 108. As illustrated, starting at time zero (i.e., the left vertical axis) an AC voltage is present across the contacts 112, 114 of switch 108. At time $t_1$ the relay coil 111 is energized. For a brief time period of approximately 1 millisecond (the time duration being dependent on the particular relay used) after energization of the relay coil 111, transient voltages appear across the coil 111 until they dampen and a clean AC voltage waveform is present across coil 111. After time $t_1$, coil 111 begins to magnetically attract the contacts of the switches 108, 110 such that they start to close. After a time delay of approximately 3 milliseconds in the present example, the contacts of switches 108, 110 close enough to allow current to start conducting to the motor windings 204, 206.

Figures 5A, 5B, 5C:
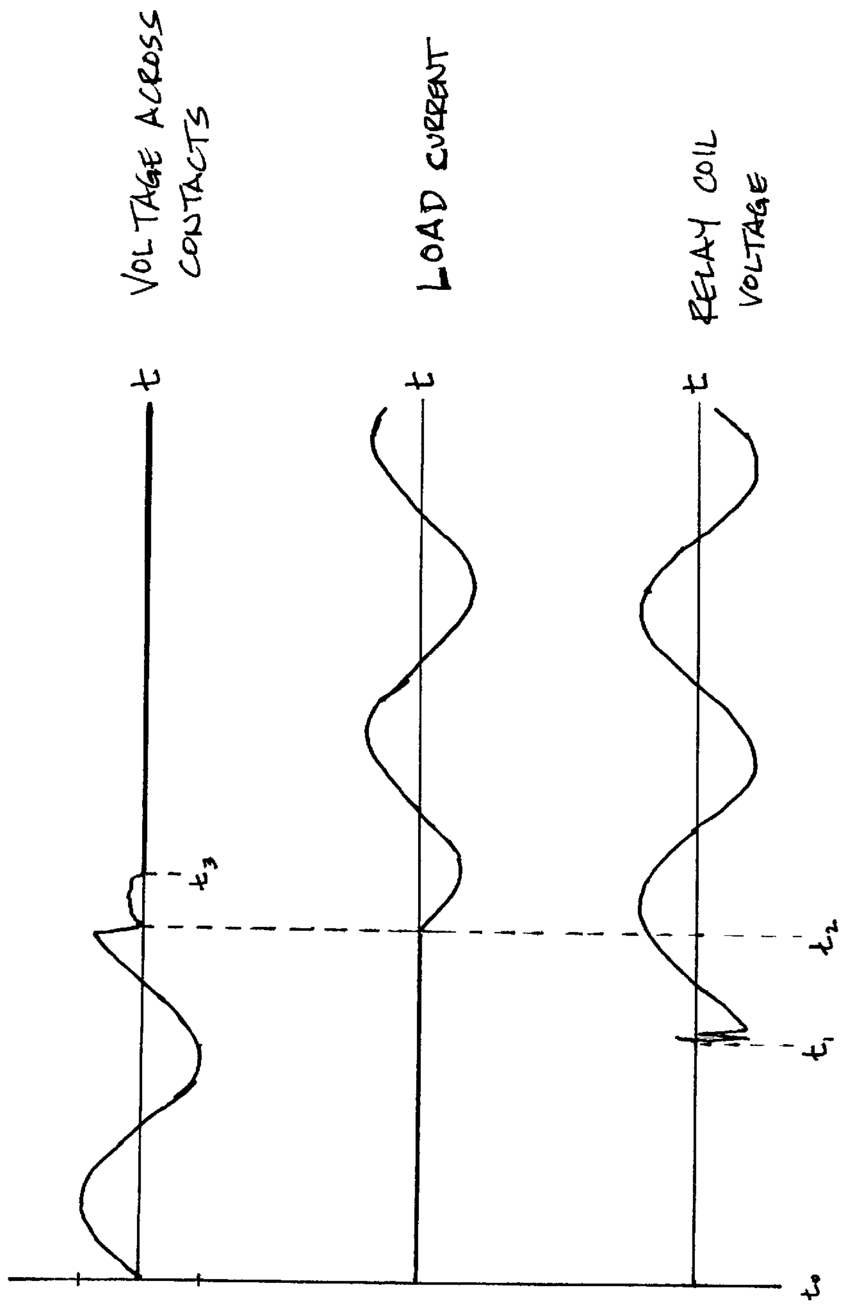
FIG. 5C PRIOR ART
FIGS. 5A–5C illustrate voltage and current waveforms occurring at various points in the circuit of FIG. 4.

As illustrated in FIG. 3B, motor current begins conducting at time $t_2$, which corresponds to the time at which the switches 108, 110 begin conducting as evidenced by the reduction of the voltage across the contacts of switch 108 to zero volts as illustrated in FIG. 3A. After time $t_{2.}$ the voltage across the contacts remains at zero volts indicating the lack of arcing across the contacts of the switches 108, 110 (as opposed to the voltage arising between times $t_2$ and $t_3$ illustrated in FIG. 5A in the circuit having no arc suppression). This is due to the operation of the triac 120, which prevents any significant arcing across the contacts of switches 108, 110 by entering a conducting state if sufficient voltage appear at the node 122.

Relay switches having lower ratings and, consequently, smaller size may be used in the above-described arc suppression circuit 102 than in prior art devices because no arcing occurs across the contacts of the switches. Such size reduction allows the circuit 102 be placed within the motor housing. Additionally, the contacts may be either a double pole relay as shown or multiple single pole relay switches. In another variation, the contacts may also be two poles of a contactor or a single pole of a contactor that has an electrical connection electrically connected to the connection between the contacts. The electrical connection would, in turn, be connected to the gate electrode of the triac 120.

Figure 7:
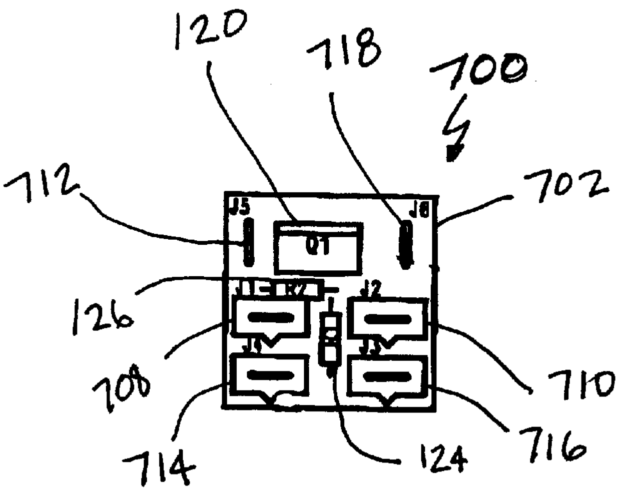
FIG. 7 illustrates a configuration of the arc suppressing circuit constructed in accordance with the teachings of the invention for connection to a standard relay.
Figure 8:
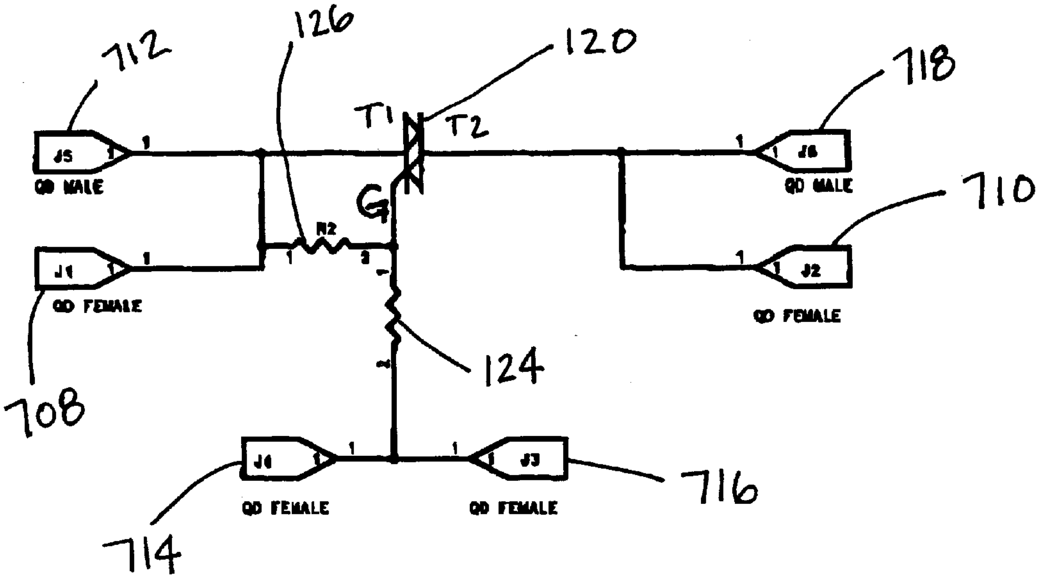
FIG. 8 illustrates a schematic circuit diagram of the configuration illustrated in FIG. 7.

A further advantage is that the circuits, 102, 302 may be configured as a unit that is easily plugged into or onto quick connect terminals of a standard relay. For example, FIG. 7 illustrates a unit configuration 700 for the circuit 102 that is designed to be plugged onto quick-connect terminals of a Potter & Brumfield T92 series, double-pole relay having quick connect terminals (e.g., Potter & Brumfield model number T92P7A22-120). A mounting board 702 or any equivalent structure or device that may be used for mounting electrical components is provided to contain the unit configuration 700 for the circuits 102, 302. Mounted on the mounting board are female terminals 708 and 710. These terminals are disposed on the mounting board 702 in such a location that they mate with male quick connect terminals of a standard relay housing. As can be seen in FIG. 8, which shows the circuit schematic of the unit configuration 700, the terminals 708 and 710 are electrically connected to terminals T1 and T2, respectively, of triac 120, which is also mounted on the mounting board 702. Terminal 708, when connected to the standard relay quick connect terminals, electrically connects with a contact of switch 108 (shown in FIG. 1) and terminal 710 connects to a contact of switch 110 (shown in FIG. 1).

Another pair of female terminals 714, 716 is disposed on mounting board 702 in such a configuration and location that they mate with male quick connect terminals on the standard relay housing that are, in turn, connected to terminals 114 and 116 (shown in FIG. 1) that are respectively connected to contacts of switches 108 and 11O. The mounting board 702 also contains circuitry that electrically connects the female terminals 714 and 716 together to constitute the center node 122. This connection is shown schematically in FIG. 8 and is connected to resistor 124, also mounted on the mounting board 702, which electrically connects the terminals 714 and 716 to the gate terminal G of the triac 120.

For the purpose of connecting the unit configuration 700 to a circuit in which it is employed (e.g., a motor control circuit), male terminals 712 and 718 are provided. These terminals correspond to terminals 112 and 118 illustrated in FIG. 1, FIG. 2 or FIG. 6 and are used to connect the arc suppression circuit 102 in series between the voltage supply terminals and a load. Terminals 712 and 718 are also electrically connected to female terminals 708 and 710 on the mounting board 702.

In the example illustrated in FIGS. 7 and 8, resistor 126 is also shown mounted to the mounting board 702 and electrically connected between the gate terminal of the triac 120 and terminal T1. Resistor 126 may be used to desensitize the gate terminal and guard against transient voltages and noise, as previously discussed.

The unit configuration 700 allows the arc suppression circuit 102 or 302 to be easily and quickly connected to a standard two-pole relay. The unit configuration 700 connected in combination with a standard two-pole relay are then easily connected via terminals 712 and 718 to an existing circuit such as a motor control circuit that previously utilized a single pole relay. These male terminals 712 and 718 are configured and located to connect to any extant relay spacing and configuration arrangement that was employed in an existing circuit configuration. This also affords ease of addition of the arc suppression circuit 102 or 302 constructed in accordance with the teachings of the invention to existing power supply circuits employing single pole relays. It will be appreciated by those skilled in the art that the specific configuration of elements as shown in FIG. 7 is only exemplary and may be modified to conform to various configurations of different relay types and sizes and different relay manufacturers.

The above disclosed arc suppression circuits 102, 302 allow isolation of the triac trigger. This allows the triac 120 to turn on to a conducting state only during switch bouncing and only for a very short period between the closure of switch 108 and switch 110, such as when they do not close exactly simultaneously.

The triac 120 of disclosed circuits 102, 302 does not generate excessive heat. All the current to the load is carried by the mechanical contacts except during short time periods when the switch bounces during opening or closing. The disclosed circuits also greatly enhance switch contact life where the life of the contacts may be extended as much as fifty (50) times that of the normally rated electrical life, as rated by the manufacturer. Additionally, because the triac 120 does not significantly heat up, no heat sinking is required, thus allowing further minimization of space required for the arc suppression circuits 102, 302.

Although certain examples have been described herein, the scope of the coverage of this patent is not limited thereto. On the contrary, this patent covers all examples fairly falling within the scope of the appended claims, either literally or under the doctrine of equivalents.

What is claimed is:

1. An arc suppressing circuit comprising:

a first switch having first and second contacts;

a second switch having third and fourth contacts with the third contact electrically connected with the second contact of the first switch at a node;

a triggerable electronic switch having first and second terminals and a gate electrode, the electronic switch connected in parallel with the first and second switches with the gate electrode being electrically connected to the node between the first and second switches.

2. An arc suppressing circuit as defined in claim 1, wherein the triggerable electronic switch is a triac which conducts in response to a difference between a voltage present at the gate electrode and a voltage present at least one of the first and second terminals.

3. An arc suppressing circuit as defined in claim 2, wherein the triac is switched to a conducting state when at least one of the first switch and the second switch bounces.

4. An arc suppressing circuit and defined in claim 2, wherein the triac conducts current during periods when at least one of the first switch and the second switch are bouncing, the conduction of current in the triac suppressing arcing with respect to at least one of the first and second switches.

5. An arc suppressing circuit and defined in claim 1, further comprising a first resistance electrically connecting the gate electrode to the center node.

6. An arc suppressing circuit and defined in claim 5, further comprising a second resistance electrically connecting the first contact to the gate electrode.

7. An arc suppressing circuit and defined in claim 1, wherein the circuit is a separate unit that is configured to be connected to quick connect terminals of a standard relay.

8. An arc suppressing circuit and defined in claim 1, wherein a voltage difference above a predefined threshold between the center node and one of the first and second terminals of the triggerable electronic switch causes the triggerable electronic switch to be placed in a conducting state, and a voltage difference between below the predefined threshold between the center node and one of the first and second terminals of the triggerable electronic switch causes the triggerable electronic switch to be placed in a non-conducting state.

9. An arc suppressing circuit and defined in claim 1, wherein the circuit is connected to a power source and a load and controls the application of power from the power source to the load.

10. An arc suppressing circuit comprising:

a first switch;

a second switch connected in series with the first switch at a common node;

a relay coil configured to simultaneously operate the first and second switches;

an electronic switch connected in parallel to the series connection of the first and second switches, wherein the electronic switch is configured to be triggered when a voltage difference occurs between the common node and at least one terminal of the electronic switch.

11. The arc suppressing circuit according to claim 10, wherein the electronic switch comprises a triac.

12. The arc suppressing circuit according to claim 11, wherein the triac is switched to a conducting state when at least one of the first switch and the second switch bounces causing the voltage difference to occur.

13. The arc suppressing circuit according to claim 11, wherein the triac conducts current during periods when at least one of the first switch and the second switch are bouncing, the conduction of current in the triac suppressing arcing across at least one of the first and second switches.

14. An arc suppressing circuit as defined in claim 10, wherein when the voltage difference above a predefined threshold between the center node and the at least one terminal of the electronic switch causes the electronic switch to be placed in a conducting state, and a voltage difference below the predefined threshold between the center node and the at least one terminal of the electronic switching means causes the electronic switch to return to a non-conducting state.

15. The arc suppressing circuit according to claim 10, further comprising a first resistance electrically connecting the gate electrode and the center node.

16. The arc suppressing circuit according to claim 15, further comprising a second resistance electrically connecting the at least one terminal of the electronic switching means and the gate electrode.

17. An arc suppressing circuit and defined in claim 10, wherein the circuit is a separate unit that is configured to be connected to quick connect terminals of a standard relay.

18. The arc suppressing circuit according to claim 10, wherein the circuit is connected to a power source and a load and controls the application of power from the power source to the load.

19. A method of suppressing an arc in a switching circuit, comprising the steps of:

providing a first switch having first and second contacts;

providing a second switch having third and fourth contacts;

connecting the third contact electrically in series with the second contact of the first switch at a node;

connecting a triggerable electronic switch electrically in parallel with the first and second switches with a gate electrode of the electronic switch connected to the node between the first and second switches; and triggering the triggerable electronic switch to a conducting state when a voltage difference occurs between the node and at least one terminal of the electronic switch to thereby extinguish arcing occurring in at least one of the first and second switches.

20. The method according to claim 19, wherein the triggerable electronic switch remains in the conduction state after being triggered to the conduction state for at most one-half cycle of current of the AC power source.

21. The method according to claim 19, wherein the triggerable electronic switch returns to a non-conducting state when the voltage difference between the center node and at least one terminal falls below a predefined threshold.

22. The method according to claim 19, further comprising the step of:

energizing the relay coil to close the first and second switches to connect the AC power supply to the load;

wherein bouncing of one or more of the first and second switches occurring during closing creates arcing in one or more of the first and second switches and the voltage difference between the node and at least one terminal of the triggerable electronic switch.

23. The method according to claim 19, further comprising the step of:

de-energizing the relay coil to open the first and second switches to disconnect the AC power supply from the load;

wherein bouncing of one or more of the first and second switches occurring during opening creates arcing and the voltage difference between the node and at least one terminal of the triggerable electronic switch.

* * * * *